United States Patent [19]

Maurer et al.

[11] Patent Number: 4,466,384

[45] Date of Patent: Aug. 21, 1984

[54] ARRANGEMENT FOR COOLING A GAS PRODUCED IN A GASIFIER

[75] Inventors: Erich Maurer, Oberhausen; Aruth Rafael, Wesel; Heinrich Wefing, Mülheim, all of Fed. Rep. of Germany

[73] Assignee: Deutsche Babcock Anlagen Aktiengesellschaft, Oberhausen, Fed. Rep. of Germany

[21] Appl. No.: 472,943

[22] Filed: Mar. 7, 1983

[30] Foreign Application Priority Data

Mar. 9, 1982 [DE] Fed. Rep. of Germany ....... 3208421

[51] Int. Cl.³ .......................... F22B 37/52; F22D 1/00
[52] U.S. Cl. ..................................... 122/392; 122/510; 122/7 R
[58] Field of Search ................... 122/32, 33, 510, 511, 122/512, 7 R, 392; 165/145

[56] References Cited

U.S. PATENT DOCUMENTS

| 1,849,737 | 3/1932 | Weis | 122/392 |
| 2,918,910 | 12/1959 | Fink | 122/392 X |
| 3,143,102 | 8/1964 | Wahl | 122/510 X |
| 4,309,196 | 1/1982 | Vollhardt | 122/32 X |
| 4,314,826 | 2/1982 | Vollhardt | 122/392 X |

*Primary Examiner*—Henry C. Yuen
*Attorney, Agent, or Firm*—Max Fogiel

[57] ABSTRACT

Product gas produced in a gasifier is cooled in a waste heat system consisting of a radiation part and a convection part connected thereto. The radiation part and the convection part each contain a pressure vessel with an insert provided therein at a distance. These are constructed by pipes welded gas-tightly together. The inserts are arranged removably in the pressure vessel. A free stabilization space is provided within the insert of the radiation part in the region of the gas inlet. Platen heating surfaces are located in flow direction of the product gas. The radiation part is provided separate from the gasifier and is connected thereto by a pipe conduit.

14 Claims, 4 Drawing Figures

ARRANGEMENT FOR COOLING A GAS PRODUCED IN A GASIFIER

BACKGROUND OF THE INVENTION

The present invention relates to an arrangement for cooling a gas produced in a gasifier, in which there is provided a radiation part and a following convection part. A pressure vessel with an insert is arranged in spaced relationship form the wall of the pressure vessel. The insert of the radiation part is formed by pipes welded gas-tightly together.

In a known gasifier (DE—Pat. publication No. 29 33 716) the reactor is arranged together with the downstream radiation part of the waste heat system within a pressure vessel. The gasification procedure thereby is conducted in such a manner that the temperature of the product gas is above the melting temperature of the ash. The product gas thereby contains ash particles which are still liquid. The radiation part is directed to this gas in such a manner and the radiation heating surfaces have dimensions so that the gas temperature at the outlet of the radiation part lies below the sintering temperature of the coal that is used.

SUMMARY OF THE INVENTION

The present invention has the object to adapt the waste heat system such that it is directed to a product gas produced in the gasifier, where the temperature is essentially below the sintering temperature of the ash, and the waste heat system is independent of the construction of the gasifier.

The object of the present invention is achieved by providing that the radiation part is located separately from the gasifier and is connected to it by a pipe conduit. Furthermore, the inserts are arranged removably in the pressure vessel. A free stabilization space is provided with platen heating surfaces arranged in the flow direction of the produced gas behind the stabilization space. The platen heating surfaces are within the insert of the radiation part in the region of the gas inlet.

This waste heat system can be connected to any type of gasifier, because there is no constructional unity between the gasifier and the radiation part of the waste heat system. Platen heating surfaces can be constructed in the radiation part because the product gas does not contain ash constituents in liquid form. The danger of contamination of the heating surfaces is thereby reduced. Due to these platen heating surfaces, which cool the product gas intensively, the totally required radiation surfaces can be compacted into a small space. The stabilization space above the platen heating surfaces provide for an equalization of the flow.

The novel features which are considered as characteristics for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
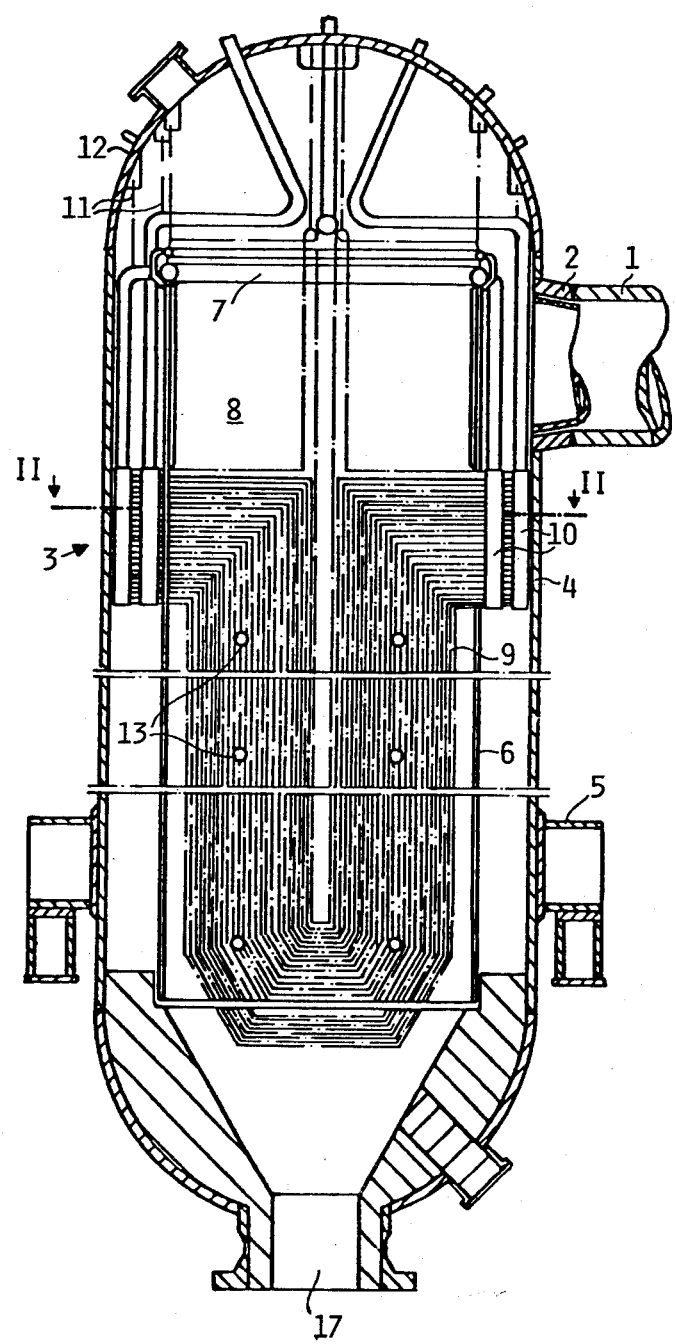
FIG. 1 is a longitudinal section through the radiation part of an arrangement in accordance with the present invention.

In a gasifier (not illustrated), which can be constructed as a flue flow or fluidized bed gasifier operated under super-pressure, a product gas is produced. The temperature of the product gas is just so that in the flue dust carried along by the product gas, no melting ash constituents are contained. The gasifier is connected by a short pipe conduit 1 to the inlet pipe connection 2 of a radiation part belonging to a waste heat system.

The radiation part 3 consists of a pressure vessel 4, which is preferably cylindrical, and is supported by claws 5 on an outer support frame. An insert 6 is provided within the pressure vessel 1 at a distance from the vessel wall. This insert 6 is formed by vertically located pipes, which are welded gas-tightly together by means of webs. This insert presents a radiation cooler through which the cooling product flows parallel to the pipes from above to below.

The inlet pipe connection 2 is located in the upper part of the side wall of the pressure vessel 4. At the level of the inlet pipe connection 2, the pipes of the insert 6 are fanned out so as to form an inlet opening. A ceiling 7 or lid closes the insert to above, which, similar to the remainder of the insert, consists of pipes that are welded gas-tightly together by means of webs.

In the upper part of the insert 6, a stabilization space 8 is provided. This space is free of inserts and causes the flow of the gas entering from the side to be stabilized. The level of the stabilization space 8 corresponds approximately to the level of the inlet cross section of the gas. Below the stabilization space 8 platen heating surfaces 9 are suspended in the insert 6. Its walls are constructed of several pipes and are aligned parallel to each other and, thereby parallel to the flow direction of the gas. The pipes of the platen heating surfaces 9 are passed through the insert 6 and terminate in collectors 10, which are provided between the inserts 6 and the vessel wall.

The supplies to the collectors 10 are suspended in the pressure vessel 4 similarly to the total insert 6. Thereby the suspensions 11 are attached in the lid 12 of the pressure vessel 4. All suspensions 11 are provided in the inner space of the pressure vessel 4 separated by the insert 6 and the ceiling 7. The suspensions 11, thereby do not come into contact with the hot product gas. The lid 12 carrying the suspensions 11 is removable. When lifting the lid 12, all built-in parts are lifted too and therewith are withdrawn from the pressure vessel 4.

Soot blowers 13 are provided in several horizontal planes above each other transversely to the platen heating surfaces 9. Each soot blower 13 consists of an outer jacket pipe 14, into which the actual blowing pipe 15 is inserted in a concentric manner thereto and also spaced therefrom at a distance. The blow nozzles for the discharge of the blow medium are passed through the jacket pipe 14. A cooling medium, which is connected to the circuit cooling the pipes of the insert 6 and the platen heating surfaces 9, flows through the intermediate space between the jacket pipe 14 and the blow pipe 15. The platen heating surfaces 9 are guided along the jacket pipes 14 of the soot blowers 13. The soot blowers 13 thereby serve as spacer for the platen heating surfaces 9 and provide a safeguard against vibrations.

Further cooled and fixed soot blowers, constructed similarly to the soot blowers 13, are arranged as wall soot blowers 16 parallel to the pipes of the insert 6. These wall soot blowers 16 are connected to the wall of the insert 6.

Figure 2:
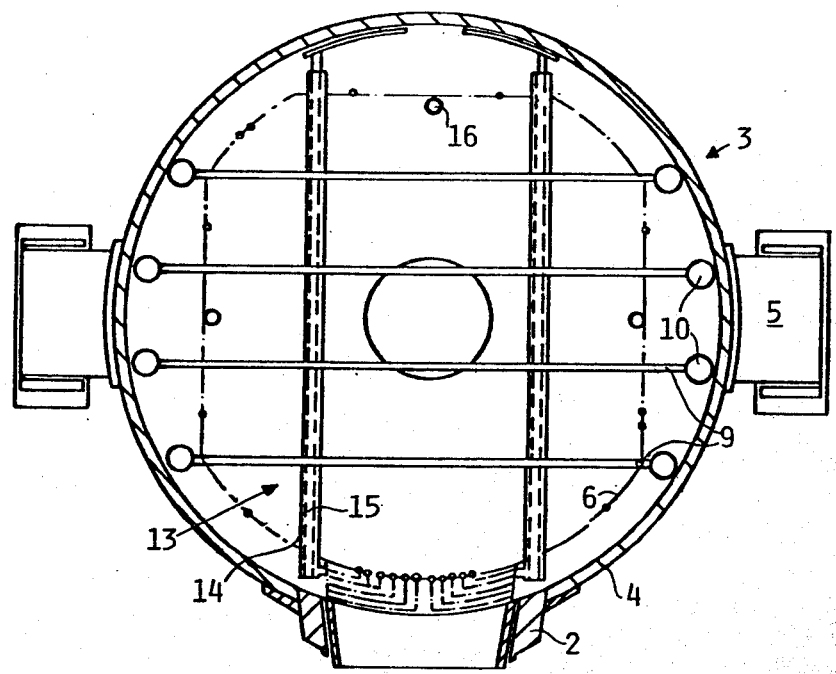
FIG. 2 is a section II—II according to FIG. 1.
Figure 4:
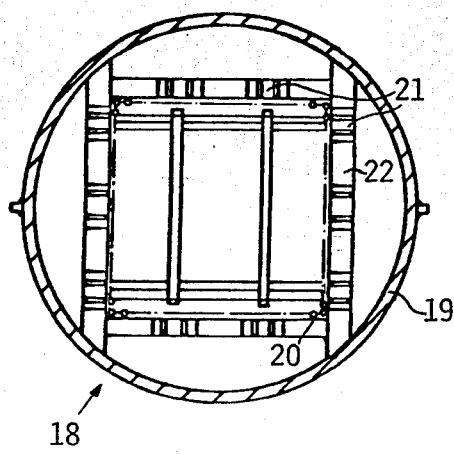
FIG. 4 is a section IV—IV according to FIG. 3.
Figure 3:
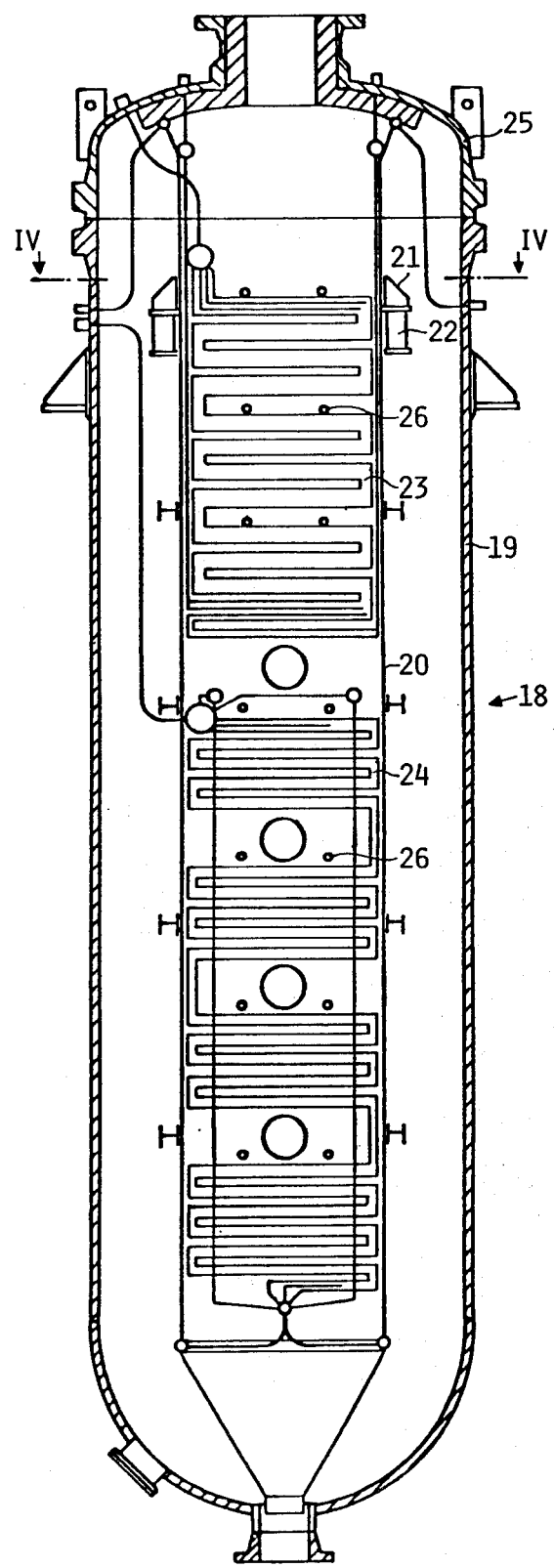
FIG. 3 is a longitudinal section through the convection part of an arrangement in accordance with the present invention.

According to FIG. 2 the insert 6, which otherwise is cylindrical, is flattened on three sides. In this manner the free cross-section between the insert 6 and the wall of the pressure vessel 4 is increased. Hereby a space is provided through which the pressure vessel 4 can be reached, and in which the collector 10 and the supply conduits to the collectors and the soot blowers can be housed. The partially cooled product gas is withdrawn through a discharge pipe connection 17 arranged in the lower part of the pressure vessel 4 of the radiation part 3, and is supplied via a pipe conduit to a convection part 18 of the waste heat system. A dust separator can be provided between the radiation part 3 and the convection part 18.

The convection part 18 is formed by a pressure vessel 19 as is the case with the radiation part 3. In this vessel an insert 20 is provided spaced from the wall of the pressure vessel 19. The insert 20 is formed by pipes arranged vertically, which are welded into a gas-tight wall by webs. The cooling product gas flow through the insert 20 from above to below.

Claws 21 are attached on the outer side of the insert 20. These claws 21 rest on supports 22 which are supported against the wall of the pressure vessel.

Convention heating surfaces in the form of snake-shaped formed pipe bundles are provided in two sections within the insert 20 of the connection part 18. The bundle heating surfaces 23 arranged in the upper part of the insert 20 are provided as super heaters. These bundle heating surfaces 23 are suspended in the removable lid 25 of the pressure vessel 19. In this manner the upper bundle heating surfaces 23 can be withdrawn from the insert 20 of the connection part 18 after a flange removal of the lid 25 by suspending therefrom.

The lower bundle heating surfaces 24 are connected to the insert 20. They can, if the pipe connections are loosened from the insert 20, be withdrawn with it from the pressure vessel 19.

Cooled, fixed soot blowers 26 are guided through the bundle heating surfaces 23, 24, which are constructed in similar manner to soot blowers 13 of the radiation part 3, as already described. The soot blowers 26 are connected to the bundle heating surfaces 23, 24. As a result, the soot blowers 26 of the upper bundle heating surfaces 23 are provided within the insert 23, whereas the soot blowers 26 of the lower bundle heating surfaces 24 are guided through the insert 20. The bundle heating surfaces 23, 24 can be removed together with the soot blowers 26 associated with them.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptions should and are intended to be comprehended within the meaning and range of equivalence of the following claims.

What is claimed is:

1. Arrangement for cooling a product gas produced in a gasifier, comprising a radiation means and convection means connected to said radiation means; said radiation means and convection means being located separate from said gasifier; a pressure vessel with an insert arranged spaced from a wall of said pressure vessel in each said radiation means and said convection means; the insert in said radiation means being formed of pipes welded gas-tightly together; said radiation means being separate from the gasifier and being connected to the gasifier by a pipe conduit communicating with the respective insert through a gas inlet; each insert being arranged removably in the pressure vessel; free stabilization space means, and cooled platen heating surfaces arranged in the flow direction of the product gas behind said stabilization space means, said platen heating surfaces being located within the insert of said radiation means in the region of said gas inlet; said platen heating surfaces extending over only a part of the insert; soot blowers located horizontally and perpendicular to the platen heating surfaces and passing through a wall and inner space of the insert of the pressure vessel in said radiation means, said soot blowers comprising a blow pipe surrounded at a distance by a jacket pipe, a cooling agent being passed through the intermediate space between the jacket pipe and the blow pipe, said platen heating surfaces being mounted on the jacket pipe.

2. Arrangement according to claim 1, wherein said radiation means has a side inlet pipe connection in its upper part, the insert of said radiation means being closed by a lid above said stabilization means, said lid being formed by cooled pipes which are welded gas-tightly together.

3. Arrangement according to claim 1, wherein the insert of said radiation means is suspended in the pressure vessel.

4. Arrangement according to claim 1, wherein the pressure vessel of said radiation means has a removable lid, suspensions being connected to the lid.

5. Arrangement according to claim 1, wherein supplies to the pipes of said radiation means and suspensions are arranged between a ceiling of the insert and a lid of the pressure vessel.

6. Arrangement according to claim 1, wherein said platen heating surfaces are arranged parallel to each other and to the longitudinal axis of the insert.

7. Arrangement according to claim 1, wherein the insert of said convection means is supported on the pressure vessel.

8. Arrangement according to claim 1, wherein the insert of the pressure vessel in said radiation means is flattened on at least one side with an increase of the distance to the wall of the pressure vessel.

9. Arrangement according to claim 1, wherein pipes of the platen heating surfaces are passed through the insert and terminate in collectors between the insert and wall of the pressure vessel in said radiation means.

10. Arrangement according to claim 1, including further soot blowers arranged in longitudinal direction of the insert in said radiation means and on a wall of said insert in said radiation means.

11. Arrangement according to claim 1, including bundle heating surfaces in said convection means and within the insert, said bundle heating surfaces comprising bundles of snake-shaped pipes, said bundle heating surfaces being suspended from a removable lid of the pressure vessel.

12. Arrangement according to claim 11, including further bundle heating surfaces in the insert and being removable together with the insert from the pressure vessel.

13. Arrangement according to claim 11, wherein cooled soot blowers are fixedly connected to said bundle heating surfaces.

14. Arrangement for cooling a product gas produced in a gasifier, comprising a radiation means and convection means connected to said radiation means; said radiation means and convection means being located separate from said gasifier; a pressure vessel with an insert arranged spaced from a wall of said pressure vessel in each said radiation means and said convection means; the insert in said radiation means being formed of pipes welded gas-tightly together; said radiation means being separate from the gasifier and being connected to the gasifier by a pipe conduit communicating with the respective insert through a gas inlet; each insert being arranged removably in the pressure vessel; free stabilization space means, and cooled platen heating surfaces arranged in the flow direction of the product gas behind said stabilization space means, said platen heating surfaces being located within the insert of said radiation means in the region of said gas inlet; said platen heating surfaces extending over only a part of the insert; said radiation means having a side inlet pipe connection in its upper part, the insert of said radiation means being closed by a lid above said stabilization means, said lid being formed by cooled pipes which are welded gas-tightly together; said insert of said radiation means being suspended in the pressure vessel; suspensions connected to said lid, said lid being removable; supplies to the pipes of said radiation means and suspensions being arranged between a ceiling of the insert and said lid; said insert of the pressure vessel in said radiation means being flattened on at least one side with an increase of the distance to the wall of the pressure vessel; said platen heating surfaces being arranged parallel to each other and to the longitudinal axis of the insert; pipes of said platen heating surfaces being passed through the insert and terminating in collectors between the insert and wall of the pressure vessel in said radiation means; soot blowers located horizontally and perpendicular to said platen heating surfaces and passing through a wall and inner space of the insert of the pressure vessel in said radiation means, said soot blowers comprising a blow pipe surrounded at a distance by a jacket pipe, a cooling agent being passed through the intermediate space between the jacket pipe and the blow pipe, said platen heating surfaces being mounted on said jacket pipe; further cooled soot blowers arranged in longitudinal direction of the insert in said radiation means and on a wall of said insert in said radiation means; the insert of said convection means being supported on the pressure vessel.

* * * * *